No. 820,730. PATENTED MAY 15, 1906.
A. O. PESSOU.
CANE HARVESTER.
APPLICATION FILED NOV. 15, 1905.
4 SHEETS—SHEET 1.
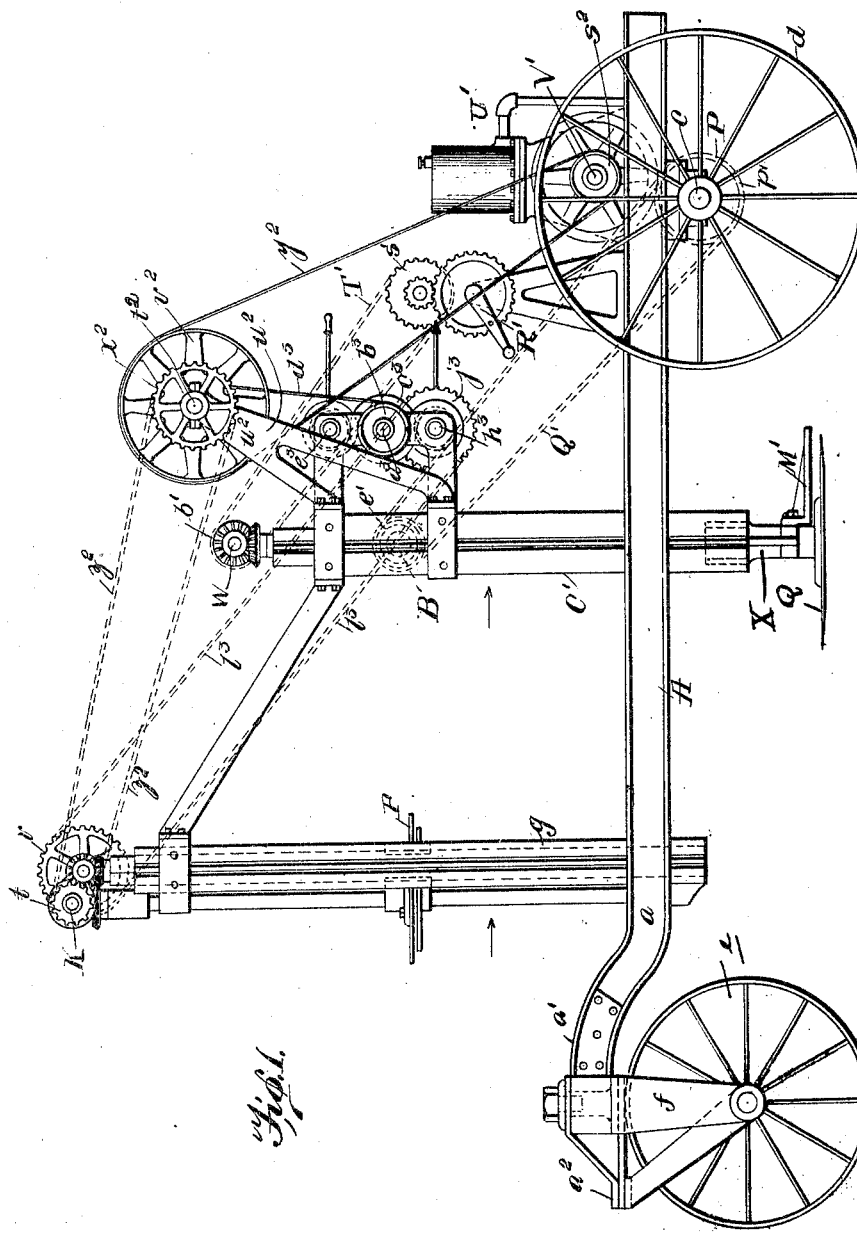
Witnesses
D. E. Wilson
N. C. Healy
Inventor
A. O. Pessou
By James J. Shuly
Attorney

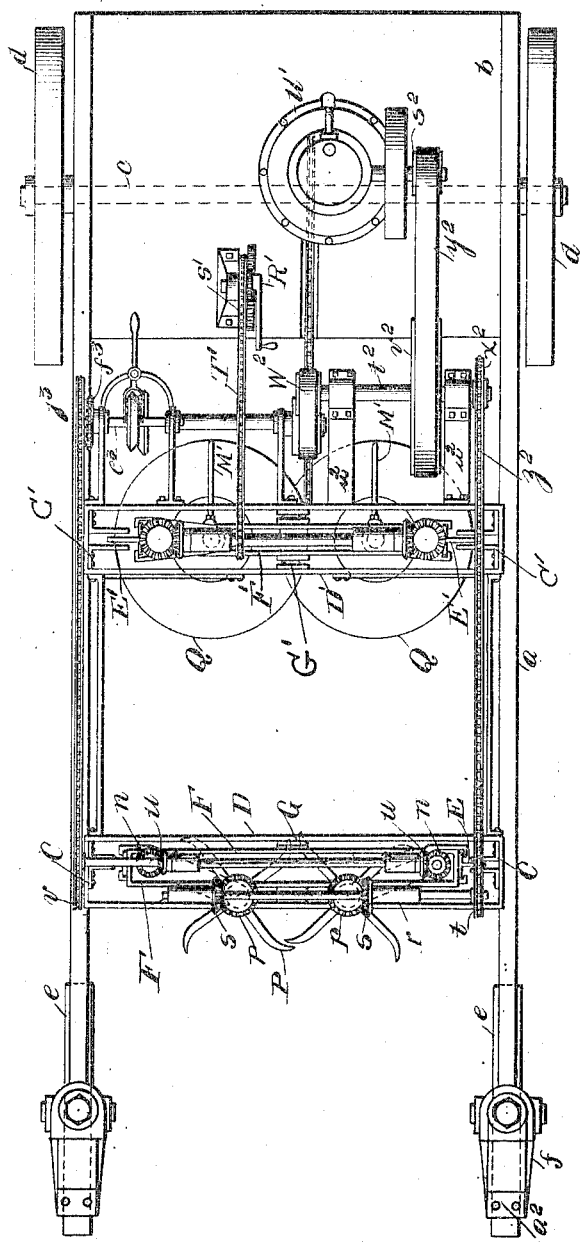

No. 820,730. PATENTED MAY 15, 1906.
A. O. PESSOU.
CANE HARVESTER.
APPLICATION FILED NOV. 15, 1905.
4 SHEETS—SHEET 3.
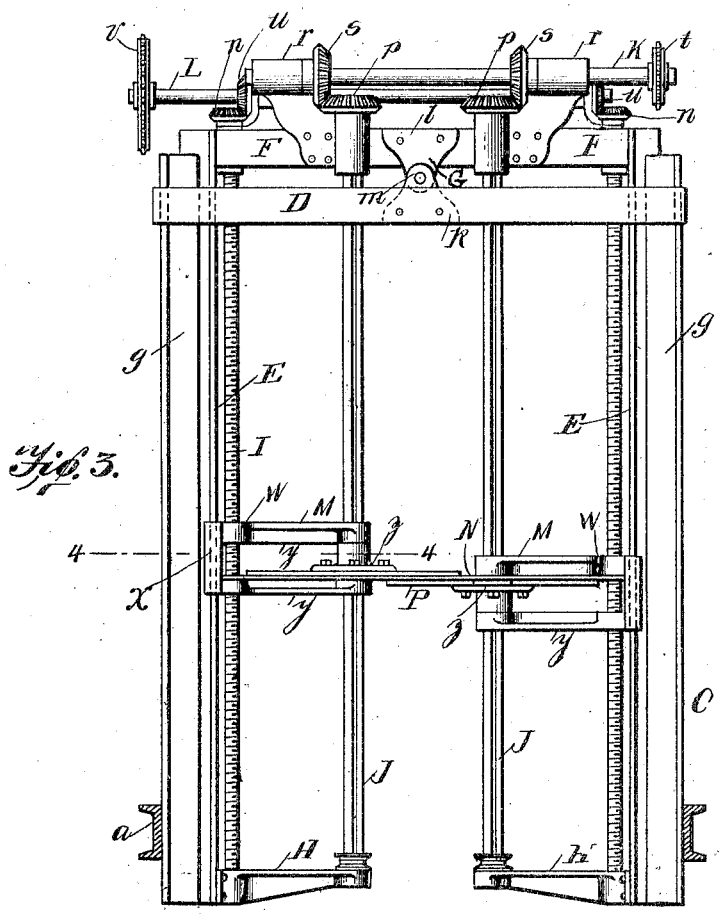
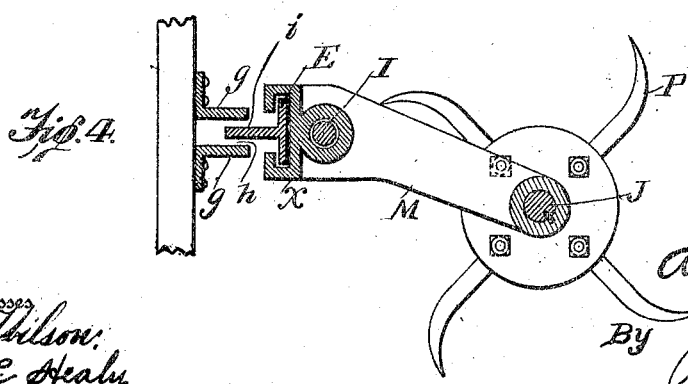

No. 820,730. PATENTED MAY 15, 1906.
A. O. PESSOU.
CANE HARVESTER.
APPLICATION FILED NOV. 15, 1905.
4 SHEETS—SHEET 4.
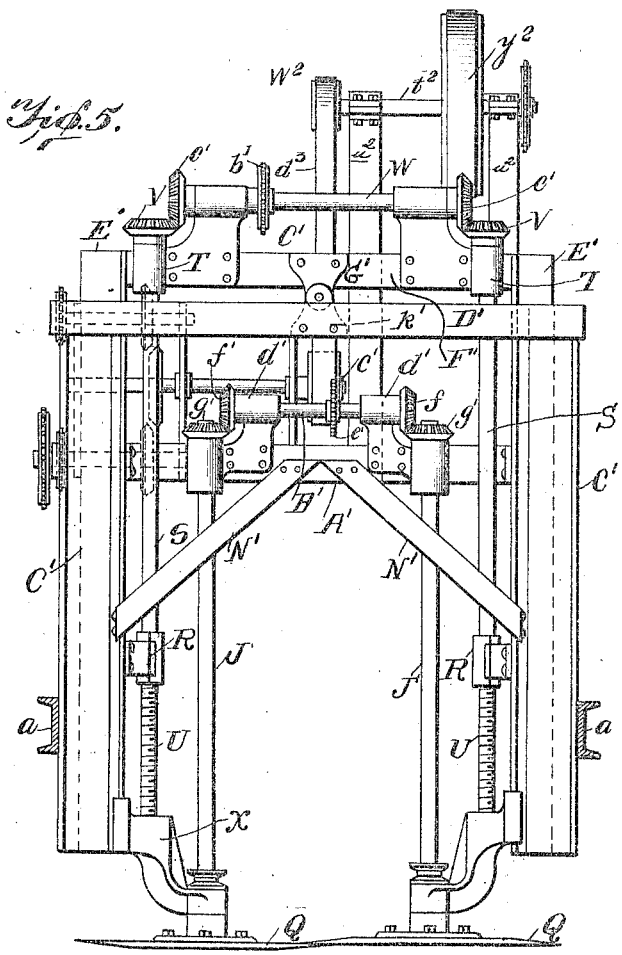
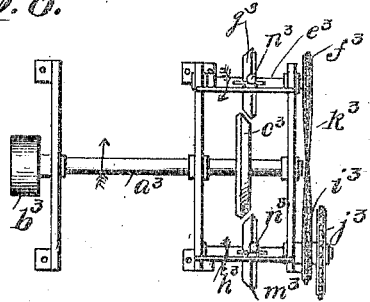

UNITED STATES PATENT OFFICE.

ALPHONSE O. PESSOU, OF NEW ORLEANS, LOUISIANA.

CANE-HARVESTER.

No. 820,730.  Specification of Letters Patent.  Patented May 15, 1906.

Application filed November 15, 1905. Serial No. 287,464.

*To all whom it may concern:*

Be it known that I, ALPHONSE O. PESSOU, a citizen of the United States, residing at New Orleans, in the parish of Orleans and State of Louisiana, have invented new and useful Improvements in Cane-Harvesters, of which the following is a specification.

My invention pertains to harvesters of the stalk-cutter type, and more particularly to sugar-cane harvesters, and it contemplates the provision of a harvester embodying means for cutting the tops off the cane and means for cutting the cane close to the ground, and this without greatly increasing the draft of the machine.

The invention also contemplates the provision, in a cane-cutting harvester, of means for adjusting the cane-cutting knives and the topping-knives vertically and adjustably fixing the said knives at various heights in order to adapt the harvester to the different conditions to be met, the means for adjusting the topping-knives being quick-acting in order to accommodate the machine to the varying heights of different patches of cane as the machine progresses therethrough.

The invention further contemplates the provision, in a machine for harvesting sugar-cane or the like, of a construction whereby the two kinds of knives—i. e., the topping-knives and the cane-cutting knives—are enabled with their driving connections to remain in an upright position and to operate to the best advantage irrespective of transverse inclination of the main frame of the machine due to inequalities of the ground on which the cutting is being done.

Other advantageous features peculiar to my invention will be fully appreciated from the following description and claims when the same are considered in connection with the accompanying drawings, forming part of this specification, in which—

Figure 1 is a side elevation of the harvester constituting the present and preferred embodiment of my invention. Fig. 2 is a top plan view of the harvester. Fig. 3 is a transverse section taken through the harvester in a plane in front of the cane-topping means.
Fig. 4 is a detail section taken in the plane indicated by the line 4 4 of Fig. 3 looking downwardly. Fig. 5 is a transverse section taken through the harvester in a plane in front of the means for severing the stalks from the ground, and Fig. 6 is a detail view of the friction-gearing constituting part of the driving connection intermediate the motor and the topping-knives for raising and lowering the said knives to suit the same to the height of the cane-stalks as said stalks are encountered incident to the progress of the machine through the field of cane.

Similar letters designate corresponding parts in all of the views of the drawings, referring to which—

A is the main frame of my novel harvester. The said frame is preferably made up of side bars $a$, of channel-iron, and a platform $b$, fixed to and resting on the rear portions of the side bars. At the rear the said main frame A is supported by a transverse shaft $c$, bearing traveling wheels $d$, while the forward portions of the side bars $a$ are supported by traveling wheels $e$. These latter wheels are mounted in yokes $f$, which are pivotally connected to the preferably raised portion $a'$ of the side bars $a$ and are preferably provided with forward extensions $a^2$ to facilitate the hitching or connection of draft-animals to the machine. The pivotal connection of the yokes $f$ to the frame-bars $a$ obviously permits of the wheels $e$ being swung horizontally to facilitate guiding of the machine, while the arrangement of the forward portions of the frame-bars $a$ apart enables the wheels $e$ to travel at opposite sides of a row of cane and adapts the topping-knives and the cane-severing knives to engage the cane to the best advantage. In this connection it will be noticed that the cane-topping means and the cane-severing means hereinafter described in detail serve to brace those portions of the side bars $a$ in advance of the platform $b$, Fig. 2, with the result that the frame as a whole is rendered stiff and rigid notwithstanding the fact that the wheels $e$ and the forward portions of the bars to which said wheels are connected are arranged apart with no connection directly intermediate the same.

C C, Figs. 2 and 3, are uprights fixed to and rising from the frame-bars $a$ and respectively comprising two angle-irons $g$, arranged a suitable distance apart to afford a space $h$ between them. D is a rectangular frame receiving and fixedly connected to the upper portions of the uprights C and arranged transverse of the machine, as best shown in Fig. 2. E E are upright bars, preferably of T form in horizontal section, having their stems $i$ disposed and movable vertically in the spaces $h$ between the angle-irons $g$ of the uprights C. F F are parallel crown-bars interposed between and fixedly connected to the upper ends of the upright bars E, and G is a transversely-rocking connection intermediate the frame D and the bars F and supporting the latter on the former.

It will be gathered from the foregoing that the uprights C and the frame D are fixed with respect to the main frame A, and it will also be gathered that the upright bars E and the crown-bars F between said upright bars E constitute a frame that is adapted to swing in a vertical plane transversely of the machine and with respect to the main frame A, the uprights C, and the frame D. Incident to such swinging of the frame formed by the bars E and the crown-bars F the stems of the bars E will move laterally in and out, as well as vertically, in the spaces $h$, afforded in the bars C. The rocking connection F may be of any construction compatible with the purpose of my invention without involving a departure from the scope thereof. I prefer, however, to have the said rocking connection comprise lugs $k$, fixed to the transverse portions of the frame D, lugs $l$, fixed to the bars $f$ of the swinging frame, and a bolt $m$, extending through the lugs $k$ and the lugs $l$ and pivotally connecting the latter lugs to the former.

The means presently described for topping the cane is carried by the transversly-swinging frame just described, and hence it will be apparent that when one side of the main frame A is higher than the other the said vertically-swinging frame will assume and remain in a pendent or vertical position, so as to enable the topping-knives to work horizontally and to the best advantage.

H H are arms fixed to and extending inwardly from the lower ends of the bars E of the vertically and transversely swinging frame.

I I are threaded shafts stepped at their lower ends in the arms H and journaled in suitable bearings carried by the crown-bars F and bearing miter-gears $n$ at their upper ends.

J J are upright shafts stepped at their lower ends in the arms H and having their upper portions journaled in suitable bearings carried by the crown-bars F and also having miter-gears $p$ at their upper ends.

K is a horizontal shaft journaled in suitable bearings $r$, rising from the crown-bars F and bearing miter-gears $s$, intermeshed with the gears $p$ and also bearing a sprocket-wheel $t$, and L is a horizontal shaft journaled in bearings on the crown-bars F and bearing miter-gears $u$, intermeshed with the gears $n$, and also bearing a sprocket-wheel $v$, the said sprocket-wheel $v$ being preferably disposed at the opposite side of the machine with reference to the sprocket-wheel $t$.

M M are vertically-movable knife-carriers which are loosely mounted on the shafts J and are provided with threaded bores $w$, receiving and engaging the threaded shafts I, whereby it will be seen that when the said shafts I are rotated the knife-carriers will be raised or lowered, according to the direction of rotation. The said knife-carriers are respectively of the construction illustrated—that is to say, they each comprise a shoe $x$, which straddles and loosely receives the head of one bar E, and arms $y'$ extending inwardly from the lower and upper ends of the said shoe.

N is a thin bar or plate disposed horizontally and extending from one carrier M to the other carrier M and fixedly connected at its ends to said carriers, and P P are the topping-knives, which are mounted in and movable with the carriers M. Each topping-knife is arranged against the bar N, so as to coöperate therewith in making a shear cut. In other words, one topping-knife is arranged in a horizontal plane immediately below that of the bar N, and the other topping-knife is arranged in a horizontal plane immediately above said bar N. Each topping-knife is bolted or otherwise suitably fixed with respect to a hub $z$, and the said hub is arranged to move vertically on and yet always turn with one of the shafts J. Any suitable expedient may be resorted to in order to accomplish this latter end, though I prefer to simply provide the hub with a feather disposed in a longitudinal groove of the shaft, as shown.

It will be readily apparent from the foregoing that the arms H, the threaded shafts I and their appurtenances, the shafts J and their appurtenances, the knife-carriers M, and the knives P will all move with the transversely-swinging frame, and yet when the shafts J are rotated the knives P will also be rotated irrespective of the elevation of the said knives, and when the threaded shafts I are rotated the knife-carriers M will be raised or lowered, according to the direction of rotation of the threaded shafts.

The cane-severing knives, which are lettered Q and are best shown in Fig. 5, are arranged to lap each other and are carried by a transversely-swinging frame generally similar to that carrying the topping-knives. The said transversely-swinging frame of the severing-knives comprises upright T-bars E' and crown-bars F', fixedly connecting the upper ends of the upright bars, and it is connected, preferably through the medium of a rocking connection G', similar to the connection G, (shown in Fig. 3 and before described,) to a frame D', fixedly connected to uprights C', which in turn are fixedly connected to and rise from the bars $a$ of the main frame A. From this it follows that the transversely-swinging frame complementary to the cane-severing knives Q is arranged to always hang in a vertical position irrespective of the transverse inclination of the main frame in the same manner as is the transversely-swinging frame complementary to the topping-knives P and for the same purpose—viz., to assure its knives always working in a horizontal or approximately horizontal position and to the best advantage.

R R are bearings fixed to the bars E' and having suitable bores.

S S are shafts journaled in said bearings R and also in bearings T on the crown-bars and having lower threaded portions U and also having miter-gears V on their upper ends.

W is a horizontal shaft journaled in suitable bearings on the said crown-bars F' and bearing a sprocket-wheel $b'$ and miter-gears $c'$, the latter being intermeshed with the miter-gears V, and X X are vertically-movable shoes, which are shaped at one end to loosely receive and straddle the heads of the bars E' and are provided at their opposite ends with eyes in which the shafts J' are journaled and through the medium of which said shafts are raised and lowered, as will be presently pointed out. The shoes X are provided with threaded bores which receive the threaded portions of the shafts S, and hence it will be observed that when the said shafts are rotated the shoes X, the shafts J', and the cane-severing knives Q will be raised or lowered, according to the direction in which the shafts are rotated.

A', Fig. 5, is a support interposed between and fixedly connected to the bars E' of the transversely-swinging frame. This support has bearings which receive the upper portions of the shafts J', and it is also provided with bearings $d'$, in which is journaled a shaft B', equipped with a sprocket-wheel $e'$ and also with miter-gears $f'$, the latter being intermeshed with miter-gears $g'$, between which and the shafts J' there is a sliding connection, whereby it will be seen that when the shaft B' is rotated rotary motion will be transmitted to the cane-severing knives Q.

With a view of preventing the severed cane from following the knives Q and being thrown to one side of the row I provide the guard-fingers M', Figs. 1 and 2. These guard-fingers are fixed to and extend rearwardly from the shoes X, and it will be apparent that the severed cane will contact with the said fingers as the machine progresses and will be caused by the same to fall in a narrow row. In serving this purpose the guard-fingers M' are assisted by the inclined bars N', which are connected to the support A', and the bars E' of the transversely-swinging frame, and are arranged to engage the upper portions of the severed cane-stalks.

I prefer to drive the cane-severing knives Q from the rear shaft $c$ of the machine through the medium of a sprocket-gear P', fixed on said shaft, and a sprocket-belt Q', which connects said gear P' and the gear $e'$ on the shaft B', and I also prefer to rotate the shaft W with a view of raising or lowering the severing-knives through the medium of a hand-crank R', mounted on the platform $b$ and fixed with respect to a sprocket-gear $s'$, and a sprocket-belt T', connecting the said gear $s'$ and the sprocket-gear $b'$ on the shaft W. It is expedient to raise or lower the cane-severing knives by hand, inasmuch as it is necessary to position the said knives but once precedent to cutting a field of cane.

U', Figs. 1 and 2, is a motor mounted on the platform $b$. This motor may be of any suitable type without affecting the spirit of my invention, though I prefer to employ an explosive-engine, such as illustrated. Motion is taken from the drive-shaft V' of the motor or engine U' to rotate the cane-topping knives P, the driving connection comprising a band-pulley $s^2$, fixed on the shaft V', a counter-shaft $t^2$, journaled in suitable brackets $u^2$, fixed with respect to the upright bars C' and the frame D' and bearing a band-pulley $v^2$, a band-pulley $w^2$, and a sprocket-gear $x^2$, a band $y^2$, connecting the pulleys $s^2$ and $v^2$, and a sprocket-belt $z^2$, connecting the sprocket-gear $x^2$ of the counter-shaft and the sprocket-gear $t$ on the shaft K. By virtue of this construction it will be observed that the topping-knives P will be rotated at a speed calculated to assure the proper topping of the cane-stalks.

In order to enable the operator of the machine to utilize the power of the motor or engine U' to raise or lower the topping-knives P quickly as changes in the height of the cane demand, I provide the mechanism best shown in Figs. 1, 2, and 5 of the drawings. This mechanism comprises a shaft $a^3$, bearing a band-pulley $b^3$ and a friction-gear $c^3$; a band $d^3$, connecting the pulley $w^2$ on the shaft $t^2$ and the said band-pulley $b^3$; a shaft $e^3$, bearing a sprocket-gear $f^3$ and a friction-gear $g^3$; a shaft $h^3$, bearing sprocket-gears $i^3$ and $j^3$; a crossed belt $k^3$, connecting the gears $f^3$ and $i^3$; a sprocket-belt $l^3$, connecting the sprocket gear $j^3$ and the sprocket-gear $y$ on the shaft L, and a friction-gear $m^3$ on the shaft $h^3$. The friction-gears $g^3$ and $m^3$ are splined or otherwise arranged on their respective shafts so as to turn with said shafts and yet be susceptible of movement in the direction of the length of the shafts. From this it follows that either of the gears $g^3$ $m^3$ may be moved and held in frictional engagement with the gear $c^3$ through the medium of levers $n^3$. It also follows that when the gear $g^3$ is moved into engagement with the constantly-rotating gear $c^3$ the shafts I will be rotated in one direction, while when the gear $m^3$ is in engagement with the gear $c^3$ the shafts I will be rotated in the opposite direction. It will further be noted that when the gear $g^3$ is in engagement with the gear $c^3$ motion will be transmitted to the sprocket-wheel $v$ through the sprocket-gear $j^3$, the crossed belt $l^3$, the sprocket-gear $i^3$, the shaft $h^3$, the sprocket-gear $j^3$, and the belt $l^3$, while when the gear $m^3$ is in engagement with the gear $c^3$ the connection to the sprocket-gear $v$ will be directly through the shaft $h^3$ and its appurtenances and the belt $l^3$.

It will be gathered from the foregoing that when the topping-knives P are positioned at a certain height and it is necessary to raise or lower the same to suit the tallness of the cane encountered the same can be readily accomplished by the operator quickly grasping one of the levers $n^3$ and pressing the friction-gear complementary to said lever into engagement with the friction-gear $c^3$. When the topping-knives are positioned as desired, the operator has but to manipulate the lever and move the friction-gear thereof out of engagement with the friction-gear $c^3$. Now while I have entered into a detailed description of one reverse-gear which I may employ for raising and lowering the topping-knives I desire it distinctly understood that any other type of reverse-gear may be employed without involving departure from the scope of my invention.

In the practical operation of my novel harvester the same is drawn by draft-animals or propelled by any suitable power through the cane-field and so that a row of cane is received between the forward portions of the side bars $a$ of the main frame A. When the harvester is thus moved through the field, it will be apparent that the knives P will first encounter and top the cane-stalks, after which the bar N will pass over the top of the stalks and the knives Q will engage the stalks and sever the same from the ground. Subsequent to the severing of the stalks the guard-fingers M' and the inclined bars N' will assure the cane falling in a neat and narrow row, as is desirable.

It will be readily appreciated from the foregoing that my novel machine is simple and inexpensive in construction, is well adapted to meet the conditions imposed on a cane-harvester and the usage to which such harvesters are ordinarily subjected, and in proportion to its capacity is very light of draft.

Having described my invention, what I claim, and desire to secure by Letters Patent, is—

1. In a cane-harvester, the combination of a main frame having side bars, uprights fixed to and rising from said side bars and means connecting the upper portions of the said uprights, a frame carried by the said connecting means and arranged to move in a transverse direction independently of the main frame, and cutting means carried by the said movable frame.

2. In a cane-harvester, the combination with a main frame having side bars, uprights fixed to and rising from said side bars, and a rigid connection between the upper portions of the said uprights; of a transversely-swinging frame hung from the said rigid connection, and cutting means carried by the said swinging frame.

3. In a cane-harvester, the combination of a transversely-swinging frame, cutting means carried by the said swinging frame, and a main frame carrying the swinging frame and having side bars extending in advance of the said swinging frame and the cutting means, whereby said side bars are enabled to receive a row of cane between them.

4. In a cane-harvester, the combination of a transversely-swinging frame, cutting means carried by the said swinging frame, a main frame carrying the swinging frame and having side bars extending in advance of the said swinging frame and cutting means, wheels supporting the rear portion of the main frame, and a guide-wheel supporting each of the forwardly-extending side bars of said main frame.

5. In a cane-harvester, a main frame having uprights and a rigid connection between the upper portions of said uprights and also having side bars extending in advance of the uprights and supported by wheels; in combination with a frame carried by the rigid connection between the uprights of the main frame and arranged to swing transversely independent of said main frame, and cutting means carried by said swinging frame.

6. In a cane-harvester, the combination with a wheel-supported main frame comprising side bars, uprights fixed to and rising from the side bars, and a rigid connection between the upper portions of the uprights; of a transversely-swinging frame hung from the said rigid connection, and horizontally-disposed cutting-knives carried by the said swinging frame.

7. In a cane-harvester, the combination of a main frame, transversely-swinging frames arranged one in front of the other in the main frame and hung from said main frame, cane-topping means carried by the forward swinging frame, and cane-severing means carried by the rear swinging frame.

8. In a cane-harvester, the combination of a main frame, transversely-swinging frames arranged one in front of the other in the main frame and hung from said main frame, cane-topping means carried by the forward swinging frame, cane-severing means carried by the rear swinging frame, and means for engaging and deflecting the cane subsequent to the severing of the same.

9. In a cane-harvester, the combination of a main frame, one or more knives carried by and movable vertically with respect to the main frame, a primary driver, and a driving connection intermediate the primary driver and the knife or knives for moving the latter vertically; the said driving connection comprising a reversing-gear, whereby the knife or knives may be either raised or lowered.

10. In a cane-harvester, the combination of a main frame, transversely-swinging frames carried by the main frame, topping-knives carried by one of said swinging frames, and cane-severing knives carried by the other swinging frame.

11. In a cane-harvester, the combination with a main frame comprising side bars, uprights fixed to and raising from said side bars at an intermediate point in the length thereof and rigidly connected together, and uprights fixedly connected to and rising from the side bars at points in rear of the first-mentioned uprights and rigidly connected together; of a transversely-swinging frame hung from the rigid connection between the forward uprights, cane-topping knives carried by the said swinging frame, a swinging frame hung from the rigid connection between the rear uprights, cane-severing knives carried by the latter swinging frame, wheels supporting the rear portion of the main frame, and guide-wheels supporting the forwardly-extended portions of the side bars of the main frame.

12. In a cane-harvester, the combination with a main frame comprising side bars, uprights fixed with respect to the side bars and having spaces, and a rigid connection between the upper portion of the said uprights; of a transversely-swinging frame hung from the said rigid connection and having upright T-bars the stems of which are disposed in the spaces of the upright fixed bars and also having a crown-bar connecting the upper portions of the T-bars, vertically-movable knife-carriers guided on the heads of the T-bars, horizontally-disposed, rotary knives movable vertically with and rotatable independently of said carriers, rotary shafts journaled in the swinging frame and engaging the knive-carriers, whereby when the shafts are rotated the carriers will be raised or lowered, and suitable means for rotating the shafts.

13. In a cane-harvester, the combination with a main frame comprising side bars, uprights fixed to and rising from the side bars at intervals in the length thereof and rigidly connected together, and a platform arranged on the rear portions of the side bars, wheels supporting the rear portion of the main frame, guide-wheels supporting the extended forward portions of the side bars of the main frame, a transversely-swinging frame hung from the connection between the forward uprights of the main frame, a transversely-swinging frame hung from the connection between the rear uprights of the main frame, cane-topping knives carried by the forward swinging frame and movable vertically, cane-severing knives carried by the rear swinging frame and movable vertically, means for raising and lowering the cane-severing knives, a driving connection between one of the rear wheels and the cane-severing knives for rotating the latter by the former, a motor mounted on the platform of the main frame, a driving connection intermediate said motor and the topping-knives for rotating the latter, and a driving connection intermediate the motor and the topping-knives for raising and lowering said knives; the latter driving connection comprising a reverse-gear, whereby the topping-knives may be either raised or lowered.

14. In a cane-harvester, the combination of a main frame, a transversely-swinging frame arranged in and hung from the main frame, vertically-movable bearings guided by the transversely-swinging frame, rotary cutters carried by the bearings, means for adjusting and adjustably fixing the bearings, and means for rotating the cutters.

15. In a cane-harvester, the combination of a main frame, a transversely-swinging frame arranged in and hung from the main frame, cane-severing means carried by the said transversely-swinging frame, and bars also carried by the transversely-swinging frame and disposed above the severing means; the said bars being inclined upward and inward.

In testimony whereof I have hereunto set my hand in presence of two subscribing witnesses.

ALPHONSE O. PESSOU.

Witnesses:
A. RITTER,
LOUIS P. BRYANT.